US008752378B2

(12) United States Patent
Ernst et al.

(10) Patent No.: US 8,752,378 B2
(45) Date of Patent: Jun. 17, 2014

(54) WASTE HEAT RECOVERY SYSTEM FOR RECAPTURING ENERGY AFTER ENGINE AFTERTREATMENT SYSTEMS

(75) Inventors: Timothy C. Ernst, Columbus, IN (US); Christopher R. Nelson, Columbus, IN (US)

(73) Assignee: Cummins Intellectual Properties, Inc., Minneapolis, MN (US)

( * ) Notice: Subject to any disclaimer, the term of this patent is extended or adjusted under 35 U.S.C. 154(b) by 401 days.

(21) Appl. No.: 13/206,386

(22) Filed: Aug. 9, 2011

(65) Prior Publication Data

US 2012/0036850 A1 Feb. 16, 2012

Related U.S. Application Data

(60) Provisional application No. 61/371,784, filed on Aug. 9, 2010.

(51) Int. Cl.
| | | |
|---|---|---|
| *F01K 23/00* | (2006.01) | |
| *F02G 3/00* | (2006.01) | |
| *F01N 3/00* | (2006.01) | |
| *F01N 3/02* | (2006.01) | |
| *F01N 5/02* | (2006.01) | |
| *F01K 23/02* | (2006.01) | |
| *F01K 23/10* | (2006.01) | |
| *F01K 23/06* | (2006.01) | |
| *F01K 25/10* | (2006.01) | |
| *F02G 5/02* | (2006.01) | |
| *F01N 3/20* | (2006.01) | |
| *F01N 3/035* | (2006.01) | |
| *F01N 3/10* | (2006.01) | |
| *F01N 3/28* | (2006.01) | |
| *F01N 9/00* | (2006.01) | |
| *F01N 13/02* | (2010.01) | |

(52) U.S. Cl.
CPC ............... *F01K 23/065* (2013.01); *F01K 23/10* (2013.01); *F01K 23/02* (2013.01); *F01K 23/106* (2013.01); *F01K 25/10* (2013.01); *F02G 5/02* (2013.01); *F01N 3/2066* (2013.01); *F01N 5/02* (2013.01); *F01N 3/035* (2013.01); *Y02T 10/166* (2013.01); *F01N 3/106* (2013.01); *F01N 3/2882* (2013.01); *F01N 9/002* (2013.01); *F01N 13/02* (2013.01); *F01N 2013/026* (2013.01); *F01N 2240/02* (2013.01); *F01N 2250/02* (2013.01); *F01N 2410/00* (2013.01); *F01N 2560/06* (2013.01); *F01N 2610/02* (2013.01); *F01N 2900/1404* (2013.01); *Y02T 10/16* (2013.01); *Y02T 10/24* (2013.01)
USPC .................. 60/618; 60/614; 60/615; 60/286; 60/320

(58) Field of Classification Search
CPC ....... F01K 23/065; F01K 23/10; F01K 23/02; F01K 23/106; F01K 25/10; F02G 5/02; F01N 3/2066; F01N 5/02; F01N 3/035; F01N 3/106; F01N 3/2882; F01N 9/002; F01N 13/02; F01N 2013/026; F01N 2240/02; F01N 2250/02; F01N 2410/00; F01N 2560/06; F01N 2610/02; F01N 2900/1404; Y02T 10/166; Y02T 10/16; Y02T 10/24
USPC .................... 60/618, 615, 614, 286, 320–323
IPC ..... F01N 3/24, 5/02; F01K 23/01, 23/02; F02G 5/02
See application file for complete search history.

(56) References Cited

U.S. PATENT DOCUMENTS

| | | | |
|---|---|---|---|
| 3,232,052 | A | 2/1966 | Ricard |
| 3,789,804 | A | 2/1974 | Aguet |
| 4,009,587 | A | 3/1977 | Robinson, Jr. et al. |
| 4,164,850 | A | 8/1979 | Lowi, Jr. |
| 4,204,401 | A | 5/1980 | Earnest |
| 4,232,522 | A | 11/1980 | Steiger |
| 4,267,692 | A | 5/1981 | Earnest |
| 4,271,664 | A | 6/1981 | Earnest |
| 4,428,190 | A | 1/1984 | Bronicki |
| 4,458,493 | A | 7/1984 | Amir et al. |
| 4,581,897 | A | 4/1986 | Sankrithi |
| 4,630,572 | A | 12/1986 | Evans |

| | | | | | | |
|---|---|---|---|---|---|---|
| 4,831,817 A | 5/1989 | Linhardt | | 2009/0090109 A1 | 4/2009 | Mills et al. |
| 4,873,829 A | 10/1989 | Williamson | | 2009/0121495 A1 | 5/2009 | Mills |
| 4,911,110 A | 3/1990 | Isoda et al. | | 2009/0133646 A1 | 5/2009 | Wankhede et al. |
| 5,121,607 A | 6/1992 | George, Jr. | | 2009/0151356 A1 | 6/2009 | Ast et al. |
| 5,207,188 A | 5/1993 | Hama et al. | | 2009/0179429 A1 | 7/2009 | Ellis et al. |
| 5,421,157 A | 6/1995 | Rosenblatt | | 2009/0211253 A1 | 8/2009 | Radcliff et al. |
| 5,649,513 A | 7/1997 | Kanda | | 2009/0320477 A1 | 12/2009 | Juchymenko |
| 5,685,152 A | 11/1997 | Sterling | | 2009/0322089 A1 | 12/2009 | Mills et al. |
| 5,771,868 A | 6/1998 | Khair | | 2010/0018207 A1 | 1/2010 | Juchymenko |
| 5,806,322 A | 9/1998 | Cakmakci et al. | | 2010/0071368 A1 | 3/2010 | Kaplan et al. |
| 5,915,472 A | 6/1999 | Takikawa et al. | | 2010/0083919 A1 | 4/2010 | Bucknell |
| 5,950,425 A | 9/1999 | Takahashi et al. | | 2010/0139626 A1 | 6/2010 | Raab et al. |
| 6,014,856 A | 1/2000 | Bronicki et al. | | 2010/0180584 A1 | 7/2010 | Berger et al. |
| 6,035,643 A | 3/2000 | Rosenblatt | | 2010/0192569 A1 | 8/2010 | Ambros et al. |
| 6,055,959 A | 5/2000 | Taue | | 2010/0229525 A1 | 9/2010 | Mackay et al. |
| 6,138,649 A | 10/2000 | Khair et al. | | 2010/0257858 A1 | 10/2010 | Yaguchi et al. |
| 6,301,890 B1 | 10/2001 | Zeretzke | | 2010/0263380 A1 | 10/2010 | Biederman et al. |
| 6,321,697 B1 | 11/2001 | Matsuda et al. | | 2010/0282221 A1 | 11/2010 | Le Lievre |
| 6,324,849 B1 | 12/2001 | Togawa et al. | | 2010/0288571 A1 | 11/2010 | Dewis et al. |
| 6,393,840 B1 | 5/2002 | Hay | | 2011/0005477 A1 | 1/2011 | Terashima et al. |
| 6,494,045 B2 | 12/2002 | Rollins, III | | 2011/0006523 A1 | 1/2011 | Samuel |
| 6,523,349 B2 | 2/2003 | Viteri | | 2011/0094485 A1 | 4/2011 | Vuk et al. |
| 6,571,548 B1 | 6/2003 | Bronicki et al. | | 2011/0209473 A1 | 9/2011 | Fritz et al. |
| 6,598,397 B2 | 7/2003 | Hanna et al. | | 2012/0023946 A1 | 2/2012 | Ernst et al. |
| 6,606,848 B1 | 8/2003 | Rollins, III | | | | |
| 6,637,207 B2 | 10/2003 | Konezciny et al. | | | | |
| 6,701,712 B2 | 3/2004 | Bronicki et al. | | | | |
| 6,715,296 B2 | 4/2004 | Bakran et al. | | | | |
| 6,745,574 B1 | 6/2004 | Dettmer | | | | |
| 6,748,934 B2 | 6/2004 | Natkin et al. | | | | |
| 6,751,959 B1 | 6/2004 | McClanahan et al. | | | | |
| 6,792,756 B2 | 9/2004 | Bakran et al. | | | | |
| 6,810,668 B2 | 11/2004 | Nagatani et al. | | | | |
| 6,817,185 B2 | 11/2004 | Coney et al. | | | | |
| 6,848,259 B2 | 2/2005 | Keller-Sornig et al. | | | | |
| 6,877,323 B2 | 4/2005 | Dewis | | | | |
| 6,880,344 B2 | 4/2005 | Radcliff et al. | | | | |
| 6,910,333 B2 | 6/2005 | Minemi et al. | | | | |
| 6,964,168 B1 | 11/2005 | Pierson et al. | | | | |
| 6,977,983 B2 | 12/2005 | Correia et al. | | | | |
| 6,986,251 B2 | 1/2006 | Radcliff et al. | | | | |
| 7,007,487 B2 | 3/2006 | Belokon et al. | | | | |
| 7,028,463 B2 | 4/2006 | Hammond et al. | | | | |
| 7,044,210 B2 | 5/2006 | Usui | | | | |
| 7,069,884 B2 | 7/2006 | Baba et al. | | | | |
| 7,117,827 B1 | 10/2006 | Hinderks | | | | |
| 7,121,906 B2 | 10/2006 | Sundel | | | | |
| 7,131,259 B2 | 11/2006 | Rollins, III | | | | |
| 7,131,290 B2 | 11/2006 | Taniguchi et al. | | | | |
| 7,159,400 B2 | 1/2007 | Tsutsui et al. | | | | |
| 7,174,716 B2 | 2/2007 | Brasz et al. | | | | |
| 7,174,732 B2 | 2/2007 | Taniguchi et al. | | | | |
| 7,191,740 B2 | 3/2007 | Baba et al. | | | | |
| 7,200,996 B2 | 4/2007 | Cogswell et al. | | | | |
| 7,225,621 B2 | 6/2007 | Zimron et al. | | | | |
| 7,281,530 B2 | 10/2007 | Usui | | | | |
| 7,325,401 B1 | 2/2008 | Kesseli et al. | | | | |
| 7,340,897 B2 | 3/2008 | Zimron et al. | | | | |
| 7,454,911 B2 | 11/2008 | Tafas | | | | |
| 7,469,540 B1 | 12/2008 | Knapton et al. | | | | |
| 7,578,139 B2 | 8/2009 | Nishikawa et al. | | | | |
| 7,581,386 B2 * | 9/2009 | Ranalli et al. ............ 60/286 | | | | |
| 7,665,304 B2 | 2/2010 | Sundel | | | | |
| 7,721,552 B2 | 5/2010 | Hansson et al. | | | | |
| 7,797,940 B2 | 9/2010 | Kaplan | | | | |
| 7,823,381 B2 | 11/2010 | Misselhorn | | | | |
| 7,833,433 B2 | 11/2010 | Singh et al. | | | | |
| 7,866,157 B2 | 1/2011 | Ernst et al. | | | | |
| 7,942,001 B2 | 5/2011 | Radcliff et al. | | | | |
| 7,958,873 B2 | 6/2011 | Ernst et al. | | | | |
| 7,997,076 B2 | 8/2011 | Ernst | | | | |
| 2002/0099476 A1 | 7/2002 | Hamrin et al. | | | | |
| 2003/0033812 A1 | 2/2003 | Gerdes et al. | | | | |
| 2003/0213245 A1 | 11/2003 | Yates et al. | | | | |
| 2003/0213246 A1 | 11/2003 | Coll et al. | | | | |
| 2003/0213248 A1 | 11/2003 | Osborne et al. | | | | |
| 2005/0262842 A1 | 12/2005 | Claassen et al. | | | | |
| 2008/0289313 A1 | 11/2008 | Batscha et al. | | | | |
| 2009/0031724 A1 | 2/2009 | Ruiz | | | | |

FOREIGN PATENT DOCUMENTS

| | | | |
|---|---|---|---|
| EP | 1 333 157 A1 | 8/2003 | |
| EP | 1 273 785 B1 | 5/2007 | |
| JP | 60093110 A * | 5/1985 | ............ F01N 5/02 |
| JP | 60-222511 A | 11/1985 | |
| JP | 8-68318 A | 3/1996 | |
| JP | 9-32653 A | 2/1997 | |
| JP | 10-238418 A | 9/1998 | |
| JP | 11-166453 A | 6/1999 | |
| JP | 2005-36787 A | 2/2005 | |
| JP | 2005-42618 A | 2/2005 | |
| JP | 2005-201067 A | 7/2005 | |
| JP | 2005-329843 A | 12/2005 | |
| JP | 2008-240613 A | 10/2008 | |
| JP | 2009-167995 A | 7/2009 | |
| JP | 2009-191647 A | 8/2009 | |
| JP | 2010-77964 A | 4/2010 | |
| WO | 2009/098471 A2 | 8/2009 | |

OTHER PUBLICATIONS

Notification of transmittal of the International Search Report and the Written Opinion of the International Searching Authority, or the Declaration dated Feb. 24, 2012; International Application No. PCT/US2011/047123.

* cited by examiner

*Primary Examiner* — Thai B Trieu

(74) *Attorney, Agent, or Firm* — Foley & Lardner LLP

(57) ABSTRACT

The disclosure provides a waste heat recovery (WHR) system including a Rankine cycle (RC) subsystem for converting heat of exhaust gas from an internal combustion engine, and an internal combustion engine including the same. The WHR system includes an exhaust gas heat exchanger that is fluidly coupled downstream of an exhaust aftertreatment system and is adapted to transfer heat from the exhaust gas to a working fluid of the RC subsystem. An energy conversion device is fluidly coupled to the exhaust gas heat exchanger and is adapted to receive the vaporized working fluid and convert the energy of the transferred heat. The WHR system includes a control module adapted to control at least one parameter of the RC subsystem based on a detected aftertreatment event of a predetermined thermal management strategy of the aftertreatment system.

20 Claims, 5 Drawing Sheets

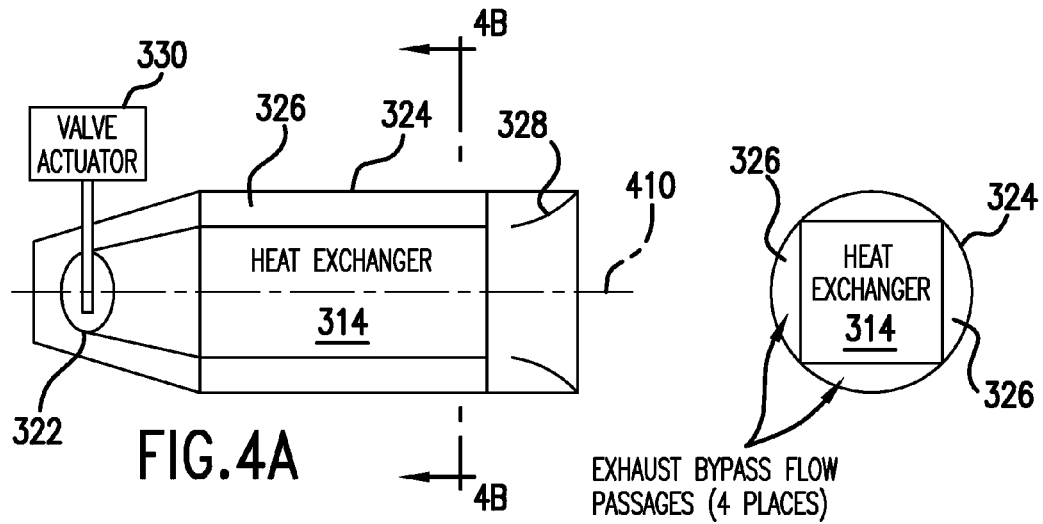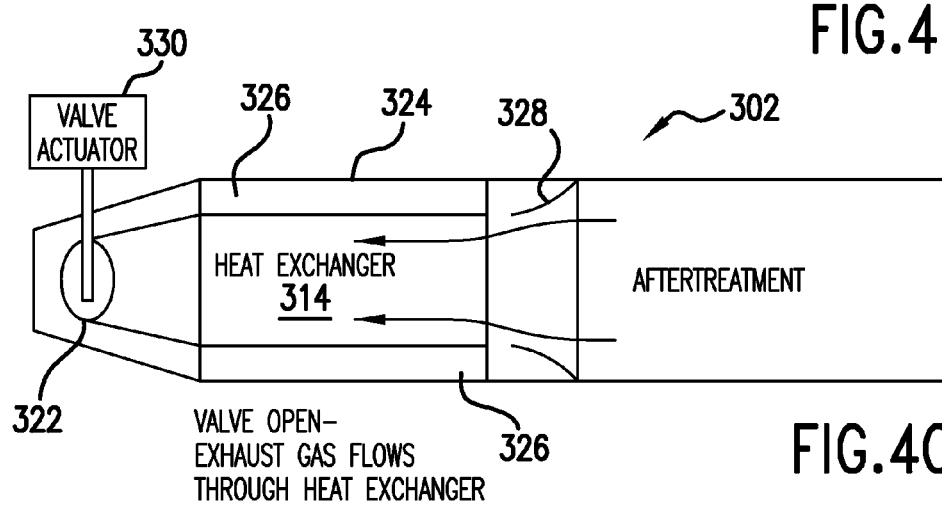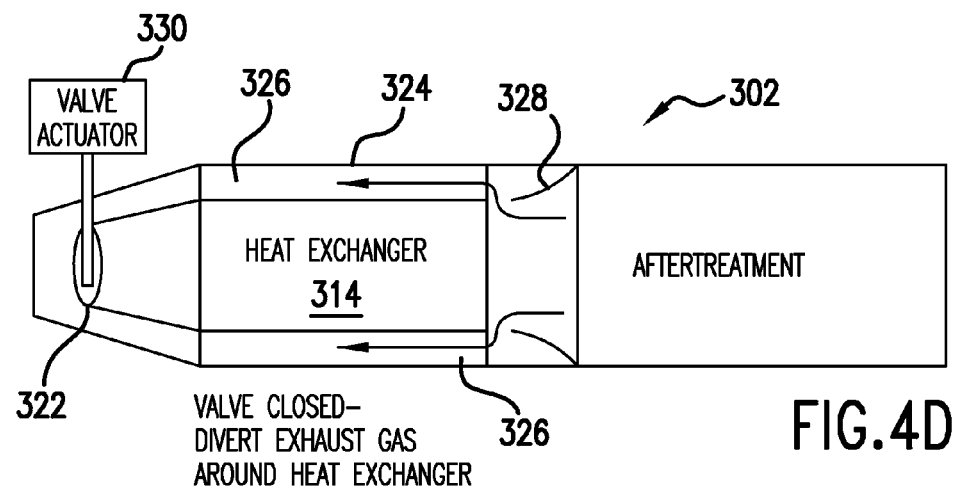

WASTE HEAT RECOVERY SYSTEM FOR RECAPTURING ENERGY AFTER ENGINE AFTERTREATMENT SYSTEMS

CROSS REFERENCE TO RELATED APPLICATIONS

This application claims benefit of priority to Provisional Patent Application No. 61/371,784, filed on Aug. 9, 2010, the entire contents of which are hereby incorporated by reference.

STATEMENT REGARDING FEDERALLY SPONSORED RESEARCH OR DEVELOPMENT

This invention was made with government support under "Exhaust Energy Recovery," contract number DE-FC26-05NT42419 awarded by the Department of Energy (DOE). The government has certain rights in the invention.

FIELD OF THE INVENTION

The invention relates to waste heat recovery systems, and more particularly, to waste heat recovery from engine exhaust using a Rankine cycle.

BACKGROUND

A Rankine cycle (RC), such as an organic Rankine cycle (ORC), can capture a portion of heat energy that normally would be wasted ("waste heat) and convert a portion of the captured heat energy into energy that can perform useful work. Systems utilizing an RC are sometimes called waste heat recovery (WHR) systems. For example, heat from an internal combustion engine system, such as exhaust gas heat energy or other engine waste heat sources (e.g., engine oil, charge gas, engine block cooling jackets) can be captured and converted to useful energy (e.g., electrical and/or mechanical energy). In this way, a portion of the waste heat energy can be recovered to increase the efficiency of a system including one or more waste heat sources.

SUMMARY

The disclosure relates to utilizing a waste heat recovery (WHR) system including Rankine cycle (RC) subsystem to efficiently capture heat energy from an exhaust aftertreatment system.

In an aspect of the disclosure, a WHR system has an RC subsystem for converting heat energy of exhaust gas from an internal combustion engine and includes an exhaust gas heat exchanger fluidly coupled downstream of an exhaust aftertreatment system. The exhaust gas heat exchanger is adapted to transfer heat from the exhaust gas to a working fluid of the RC subsystem, an energy conversion device fluidly coupled to the exhaust gas heat exchanger and adapted to receive the working fluid having the transferred heat and convert the energy of the transferred heat, a condenser fluidly coupled to the energy conversion device and adapted to receive the working fluid from which the energy was converted, and a pump having an inlet downstream of, and fluidly coupled to an outlet of the condenser and an outlet upstream of, and fluidly coupled to an inlet of the heat exchanger. The pump is adapted to move fluid from the condenser to the heat exchanger. The WHR system also includes a control module that is adapted to control at least one parameter of the RC subsystem based on a detected aftertreatment event of a predetermined thermal management strategy of the aftertreatment system.

In another aspect of the disclosure, an internal combustion engine includes an engine block including plural cylinders, an exhaust manifold fluidly connected to the block and adapted to provide a passage for exhaust gas resulting from combustion in the cylinders, an exhaust gas aftertreatment system fluidly connected to the exhaust manifold and including a diesel oxidation catalyst (DOC) and a particulate filter (PF), and a waste heat recovery system including a Rankine cycle RC subsystem. The RC subsystem includes a heat exchanger that is fluidly coupled downstream of the exhaust aftertreatment system and is adapted to transfer heat from the exhaust gas to a working fluid of the RC subsystem, and an energy conversion device that is fluidly coupled to the exhaust gas heat exchanger and is adapted to receive the working fluid having the transferred heat and to convert the energy of the transferred heat. The internal combustion engine includes a control module that is adapted to control parameters of the RC subsystem based on a detected aftertreatment event of a predetermined thermal management strategy of the aftertreatment system.

BRIEF DESCRIPTION OF THE DRAWINGS

FIGS. 4A and 4B show cross sections of a heat exchanger and bypass valve assembly according to an exemplary embodiment. FIGS. 4C and 4D show a cross section of the integrated aftertreatment system assembly including the heat exchanger and bypass valve assembly of FIGS. 4A and 4B. FIG. 4C shows the bypass valve in an open position. FIG. 4D shows the bypass valve in a closed position.

DETAILED DESCRIPTION

Figure 1:
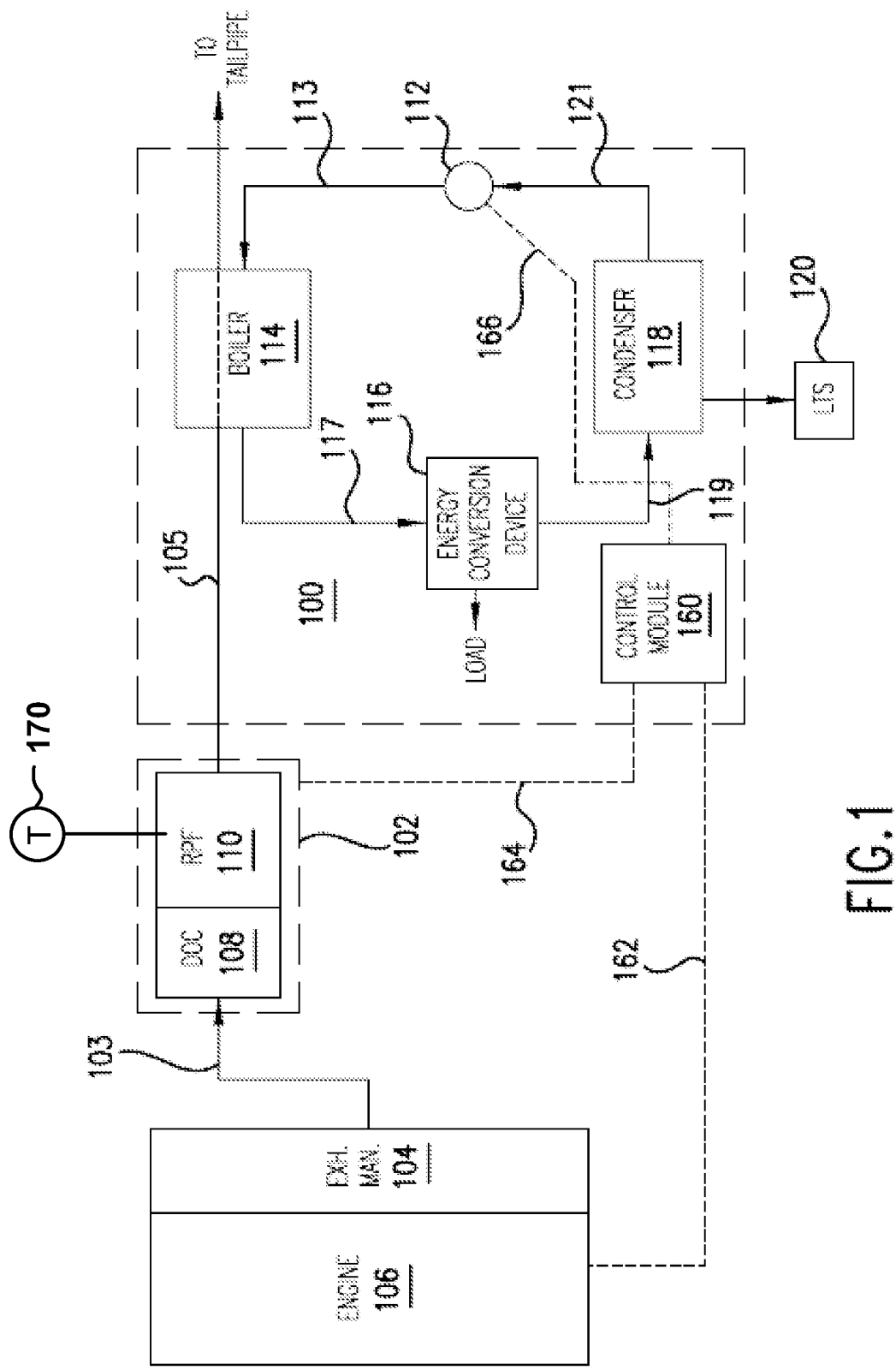
FIG. 1 is a diagram of a waste heat recovery system including an RC subsystem for controllably capturing heat energy from an exhaust gas aftertreatment system according to a generalized exemplary embodiment.

Various aspects are described hereafter in connection with exemplary embodiments. However, the disclosure should not be construed as being limited to these embodiments. Rather, these embodiments are provided so that the disclosure will be thorough and complete, and will fully convey its scope to those skilled in the art. Descriptions of well-known functions and constructions may not be provided for clarity and conciseness.

Embodiments consistent with the disclosure can increase the thermal efficiency of an engine, more particularly, a diesel engine system, by utilizing internal combustion exhaust gas heat energy and heat energy generated by an exhaust aftertreatment system. More specifically, embodiments of a WHR system use an RC (e.g., an ORC) subsystem to transfer/convert heat after at least part of the engine's exhaust gas aftertreatment system to recapture a portion of wasted heat energy from the engine itself and also waste heat from the aftertreatment. The WHR system recaptures high temperature heat energy due to thermal management strategy of engines with aftertreatment systems, as well as the normal heat energy from exhaust. The WHR system communicates with the engine thermal management strategy and engine load to adjust the parameters of the RC subsystem to improve engine efficiency, aftertreatment efficiency and/or to optimize a condition for maximum heat energy recovery.

The WHR system can be applied to any engine employing an aftertreatment system to increase the engine efficiency. The system also can compliment a hybrid power system by producing additional electrical power, mechanical power, and/or another energy conversion result (e.g., heat transfer) for consumption.

In an exemplary WHR system, a portion of the energy used to increase the temperature of the exhaust gas stream, for example, during regeneration of the particulate filter (PF) (also called a particulate matter (PM) filter), is recaptured and converted for use in a way that can increase an overall efficiency metric of a system including the WHR system. A PM filter used in a diesel engine system is called a diesel particulate filter (DPF). As is known, regeneration of a DPF is a process that involves burning off, or "oxidizing" soot and other PM that has accumulated in the filter. However, because diesel exhaust temperatures often are not sufficiently high to burn accumulated PM, various ways to raise the exhaust gas temperature or to lower the oxidation temperature have been utilized.

The increase in exhaust gas temperature can originate from thermal management of the engine exhaust, for example, dosing fuel or changing engine operating parameters, or from oxidizing the soot load in the particulate filter. For example, diesel fuel can be dosed (injected) into the engine's exhaust to raise the temperature and regenerate the PF, although exhaust gas temperatures also can be raised by changing engine parameters. Embodiments of the WHR system described herein can recapture a portion of the engine's exhaust energy, as well as the heat produced from oxidizing soot in the filter. The WHR system communicates with the engine control module (ECM), also called an engine control unit (ECU), to adjust the RC parameters in a predictive manner to account for the changing heat load based on engine operation and thermal management of the aftertreatment system, such as the diesel oxidation catalyst (DOC) and DPF filter. Under normal operating conditions, for example, when the engine was not in filter regeneration mode, the system can still recover energy from the engine exhaust at a lower temperature.

FIG. 1 is a diagram of a WHR system 100 according to an exemplary embodiment. The WHR system 100 is fluidly connected to an exhaust aftertreatment system 102, which is in turn fluidly connected via conduit 103 to an exhaust manifold (EXH. MAN.) 104 of an internal combustion engine 106. Exhaust gas exiting the exhaust manifold 104 is provided to a DOC 108, which is positioned upstream of, and fluidly connected to a robust particulate filter (RPF) 110 (or another type PF, such as a DPF), although the aftertreatment system 102 can include one or more other aftertreatment elements and plural elements can be provided as an integrated device. The DOC 108 is provided upstream of the RPF 110 to oxidize NO to generate $NO_2$ (requiring accurate control to maintain the mass ratio of NO/PM in engine-out exhaust gas), which in turn oxidizes the PM in the downstream RPF 110. Alternatively, regeneration can be achieved actively by increasing the exhaust temperature through a variety of thermal management approaches, e.g., engine management, a fuel burner, resistive heating coils or late fuel injection (into an engine cylinder). Active systems can use pulses of diesel fuel late in the combustion cycle to oxidize across the catalyst, thereby heating the RPF 110 and oxidizing trapped PM.

As shown in FIG. 1, the WHR system 100 includes an ORC subsystem that transfers thermal energy of the exhaust gases to the working fluid of the ORC, although another type RC working fluid can be used. More specifically, the ORC subsystem of the WHR system 100 includes a pump 112 (e.g., a feed or liquid pump) that moves liquid working fluid of the ORC subsystem at high pressure along conduit 113 to an inlet of a boiler (heat exchanger) 114. Boiler 114 includes a heat exchange passage fluidly connected to exhaust aftertreatment system 102 via conduit 105. Exhaust gases flowing through the boiler 114 transfer heat to the working fluid of the ORC subsystem. The working fluid of the ORC can be an organic working fluid, such as Genetron™ R-245fa from Honeywell, Therminol™, Dowtherm J from the Dow Chemical Co., Fluorinol, Toluene, dodecane, isododecane, methylundecane, neopentane, neopentane, octane, or water/methanol mixtures, or steam in a non-organic RC embodiment), for example. In the boiler 114, the working fluid boils off and produces a high pressure vapor that exits the boiler 114 and flows in conduit 117 to an inlet of an energy conversion device 116, such as a high pressure expander (e.g., a turbine).

The energy conversion device 116 of the ORC subsystem of the WHR system 100 is capable of producing additional work or transferring energy to another device or system. For example, the energy conversion device 116 can be a turbine that rotates as a result of the expanding working fluid vapor to provide additional work, which can be fed into the engine's driveline to supplement the engine's power either mechanically or electrically (e.g., by turning a generator), or it can be used to power electrical devices, parasitics or a storage battery (not shown). Alternatively, the energy conversion device can be used to transfer energy from system to another system (e.g., to transfer heat energy from WHR system 100 to a fluid for a heating system).

The working fluid exiting the outlet of the energy conversion device 116 (e.g., expanded gases of a turbine) flows to condenser 118 via conduit 119, where it is cooled and condensed. The condenser is cooled by a low temperature source (LTS) 120, such as a liquid cooling loop including a condenser cooler (not shown) and a condenser cooler pump (not shown), for example, a glycol cooling loop, and/or directly with an air-cooled heat exchanger (e.g., ram air). The condensed and cooled working fluid exits the outlet of the condenser 118 and is provided along conduit 121 at a lower pressure to pump 112, which increases the working fluid pressure to repeat the RC. While not shown, the ORC subsystem of the WHR system 100 can include other components, for example, a superheater provided with boiler 114, a recuperator that transfers heat from working fluid from the outlet of the energy conversion device to cooled working fluid between pump 112 and boiler 114, one or more receivers, and/or one or more other components.

Referring again to FIG. 1, the WHR system 100 includes a control module 160, which can be, for example, an ECU (or ECM) that monitors the performance of the engine 106 and other elements of the exhaust aftertreatment system 102. The control module 160 can be a single unit or plural control units that collectively perform these monitoring and control functions of the ORC of the WHR system 100. While FIG. 1 shows the control module as included in the WHR system 100, it is to be understood that the control module 160 can be provided separate from the system and communicate electrically with the WHR system 100 via one or more data and/or power paths. The control module 160 can also utilize sensors, such as pressure, temperature NOx and $NH_3$ sensors, to monitor the exhaust aftertreatment system 102 and/or components of WHR system 100 and determine whether the these systems are functioning properly.

The control module 160 can generate control signals to control at least one parameter of the RC subsystem based on a detected aftertreatment event of a predetermined thermal management strategy of the aftertreatment system. information provided by sensors described herein and perhaps other information, for example, stored in a database or memory integral to or separate from the control module 160. Exemplary signal paths between the control module 160, the sensors and other devices are depicted in FIG. 1 using dashed lines 162, 164, and 166. It is to be understood that dashed lines 162, 164. and 166 can be representative of either hard wired or wireless communication paths.

The control module 160 can include a processor and modules in the form of software or routines that are stored on computer readable media such as memory, which is executable by the processor of the control module 160. In alternative embodiments, the modules of control module 160 can include electronic circuits for performing some or all or part of the processing, including analog and/or digital circuitry. The modules can comprise a combination of software, electronic circuits and microprocessor based components. The control module 160 can receive data indicative of engine performance and exhaust gas composition including, but not limited to engine position sensor data, speed sensor data, exhaust mass flow sensor data, fuel rate data, pressure sensor data, temperature sensor data from locations throughout the engine 106 and the exhaust aftertreatment system 102, data regarding one or more elements of the WHR system 100, and other data. The control module 160 can then generate control signals and output these signals to control various components in the engine 106, exhaust aftertreatment system 102, and the WHR system 100.

The WHR system 100 can recapture a portion of the heat energy used for thermal management, such as regeneration (e.g., dosing fuel) in addition to normal exhaust heat energy generated by the engine 106. Because the WHR system 100 is provided downstream of the RPF 110 (or other type PF), it can recapture a portion of the energy from oxidizing soot in the RPF 110. Communication between one or more elements of the WHR system 100, for example, between the control module 160 (e.g., an ECM and/or other control module) and elements of the WHR system 100 allows the WHR system 100 to adjust Rankine cycle parameters based on a detected aftertreatment event of a predetermined thermal management strategy, such as periodic regeneration of the RPF, in which case the detected event is a time of expiry of an in use counter. Another detectable aftertreatment event of a predetermined thermal management strategy (hereinafter, "aftertreatment event") can include notification of a delta pressure measurement across the DPF reaching a predetermined threshold value. Another detectable aftertreatment event can be a soot load predictor algorithm determining regeneration is to be performed and providing notification to the controller 160 that regenerations will occur or is underway.

In an embodiment, upon detection of an aftertreatment event a parameter of the RC subsystem the flow rate of the working fluid of the ORC subsystem can be increased in a predictive manner during high heat input conditions such as high engine load or during PF regeneration, for example, by controlling the pump speed, a flow restrictor, and/or one or more valves to adjust the flow rate of the working fluid in the ORC cycle, to account for the increased heat input. This can be accomplished through a control system linked to the ECM (i.e., via a control module 160 working in conjunction with the ECM), through the ECM itself (i.e., where the control module 160 is the ECM), or via a control module 160 of the ECM.

In another example, the WHR system 100 (and other embodiments of WHR systems consistent with the disclosure) can include bypass paths between and around the system components. For example, with a WHR system including a recuperator, a bypass valve can be provided to bypass the recuperator entirely or to some limited extent, such as disclosed in U.S. application Ser. No. 12/058,810, filed on Mar. 31, 2008, which will issue as U.S. Pat. No. 7,997,076 on Aug. 16, 2011, the entire contents of which are hereby incorporated by reference. Upon detection of an aftertreatment event, a valve controlling the bypass of the recuperator can be controlled to cause the working fluid to maximize an amount of heat recovery. In another embodiment, a sensor can be provided in the working fluid path to detect an occurrence of an aftertreatment event. As shown in FIG. 1, temperature sensor 170 is provided in the exhaust flow path upstream from the boiler 114. The controller receives a signal generated as a result of the temperature detection and monitors the when the temperature exceeds one or more thresholds (for example, for corresponding to speed/load). When the detected temperature characteristic indicates and aftertreatment event, the controller can appropriately adjust the RC subsystem parameters to increase waste heat recapture.

Figure 2:
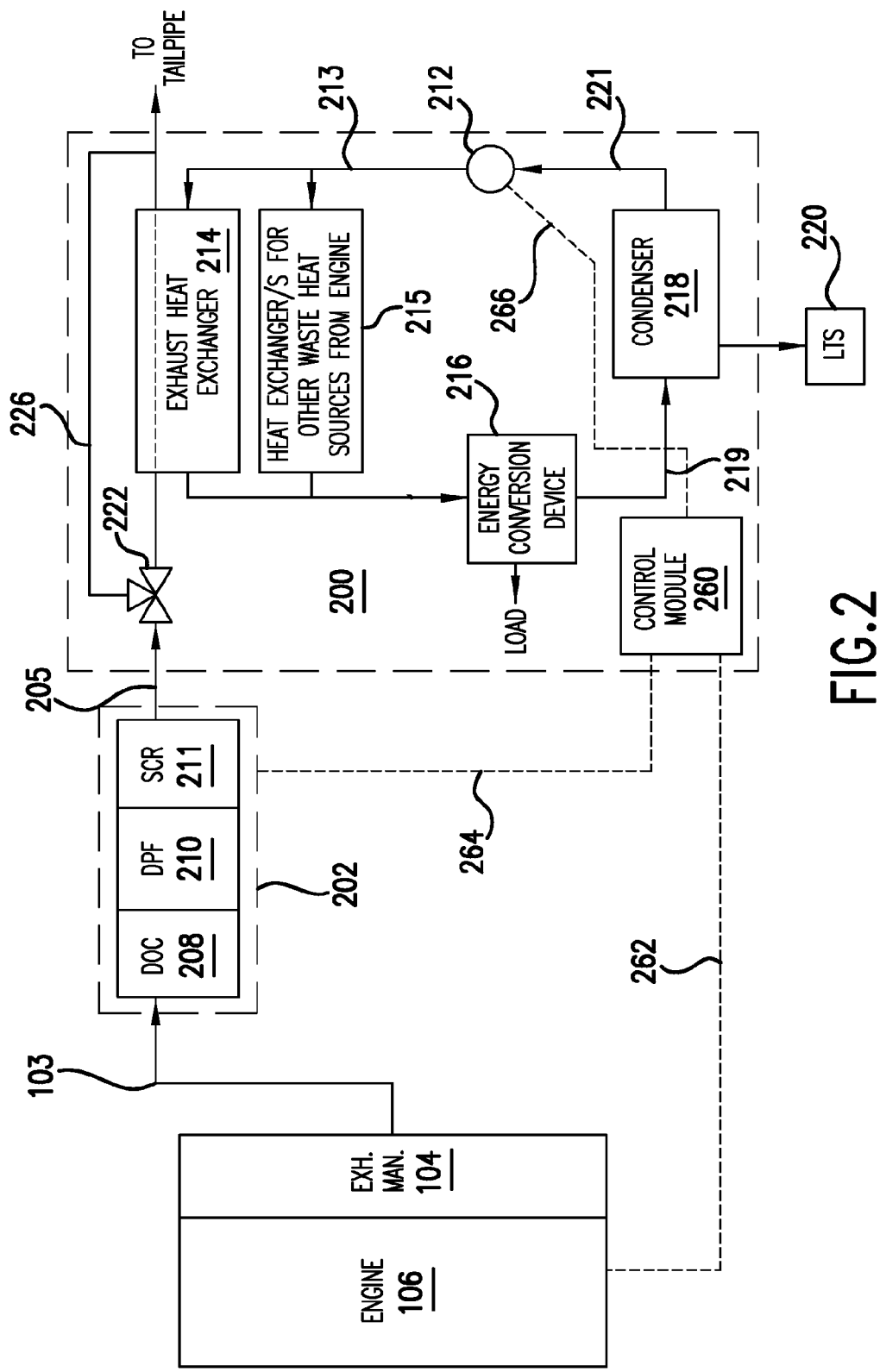
FIG. 2 is a diagram of a waste heat recovery system including an RC subsystem for controllably capturing heat energy from an exhaust gas aftertreatment system including an SCR element according to an exemplary embodiment.

FIG. 2 is a diagram of a WHR system 200 according to another exemplary embodiment. Items having the similar reference number as items in the WHR system 100 of FIG. 1 (i.e., those having references numbers that are 100 more than a like item of FIG. 1) are described above. As shown in FIG. 2, an aftertreatment system 202 includes a selective catalyst reduction (SCR) element 211 downstream of, and fluidly connected to a DOC 208 and DPF 210. Although not shown, a reductant dosing system, such as a diesel emissions fluid (DEF) dosing system, is provided upstream of the SCR to inject a reductant such as anhydrous $NH_3$, aqueous $NH_3$, or a precursor that is convertible to $NH_3$ such as urea ammonia or urea into the exhaust flow. The reductant dosing system can include a doser, a decomp reactor, and a mixer. The reductant is absorbed onto a catalyst in the SCR where it is used to convert the NOx emissions in the exhaust gas flow to nitrogen and water, and in the case of urea, also into carbon dioxide.

The treated exhaust flows from the SCR and into the WHR system 200, which includes an exhaust gas valve 222, an exhaust heat exchanger (e.g., boiler) 214, and can include one or more additional heat exchangers 215 that can exchange heat with other waste heat sources from the engine 106 (e.g., charge air, engine oil, water jackets, EGR, coolant etc.). The WHR system 200 can recapture a portion of the DOC 208 and DPF 210 energy generated from dosing fuel and burning off particulate matter from the DPF 210, and can capture and utilize waste heat in exhaust from normal engine operation to supplement engine power. In embodiments utilizing one or more additional heat exchangers 215, the exhaust heat exchanger 214 can be plumbed in parallel, series or some combination of both with the other engine waste heat sources 215.

The exhaust gas valve 222 is controllable to regulate how much exhaust heat input is utilized for the WHR system 200. In an embodiment, a temperature sensor can be provided at the outlet and/or inlet of the heat exchanger 214, inside the heat exchanger 214, and/or elsewhere in the RC subsystem to sense a temperature characteristic of the working fluid or the heat exchanger 214. The exhaust gas valve 222 can bypass exhaust gas as needed via flow path 226 (conduit) for load limiting or for preventing heat exchanger and/or working fluid overtemperature. For example, the RC subsystem or exhaust system can include a sensor adapted to sense a temperature of the RC working fluid or the heat exchanger 214 and generate a signal characteristic of the sensed temperature of the working fluid. The sensor can be an integrated device or a combination of devices and circuitry. For example, the control module 260 or another module communicating with the control module can include a comparator that compares the sensed signal with a predetermined value or range of values, and controls the exhaust gas valve 222 to one or several possible corresponding valve opening positions. In another embodiment, the exhaust gas valve 222 can be mechanically controlled by a temperature sensing device having a mechanical response to temperature change. The exhaust gas bypass valve 222 also can be actuated based on predictive map, for example, at a certain engine speed/load the heat exchanger 214 would be bypassed a certain amount based on previous knowledge of where it will need to be for load limiting purposes (i.e., a feedforward table stored in the ECU to accessed by the control module 260, or elsewhere in memory of the engine system and accessible by the control module 260 or the ECU).

Figure 3:
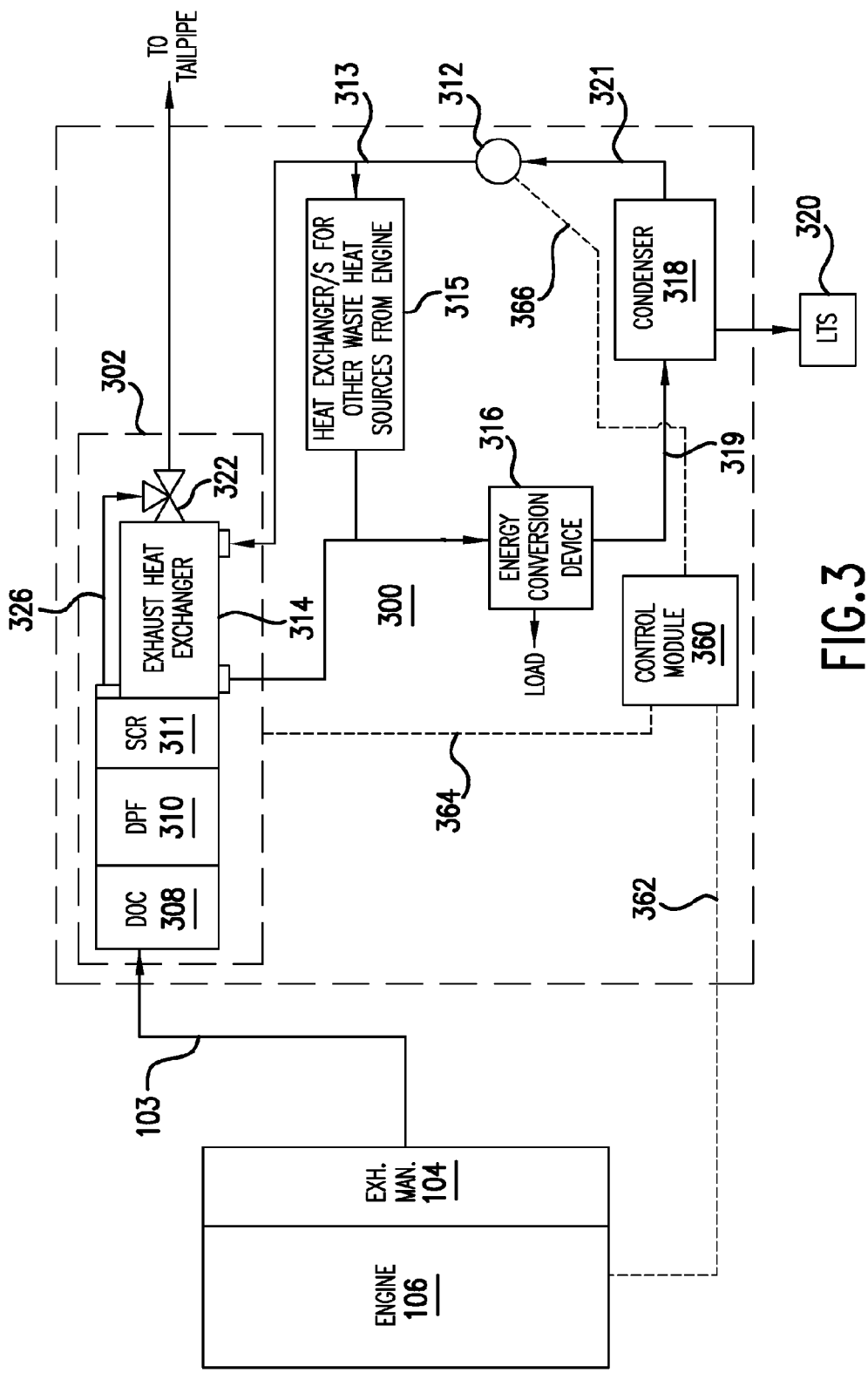
FIG. 3 is a diagram of a waste heat recovery system including an RC subsystem for controllably capturing heat energy from an exhaust gas aftertreatment system including an SCR element, where the aftertreatment system is integrated with a heat exchanger of the RC subsystem according to an exemplary embodiment.

FIG. 3 is a diagram of a WHR system 300 according to another exemplary embodiment. As with FIG. 2, items shown in FIG. 3 having numbers similar to reference numbers of items described above (i.e., items having reference numbers either 100 or 200 greater than those in FIGS. 1 and 2), are described above. The WHR system 300 integrates an exhaust heat exchanger (e.g., boiler) 314 of an RC subsystem with a DOC 308, DPF 310 and SCR 311 of an aftertreatment system, such that they are packaged together in one integrated aftertreatment system assembly 302.

The assembly 302 also includes an exhaust gas valve 322 that can control an amount of exhaust gas that is utilized by the WHR system 300. The exhaust gas valve 322 can be controlled by control module 360 to control an amount of exhaust gas flowing in the exhaust heat exchanger 314 utilizing one or more bypass flow paths 326 (conduit(s)).

FIGS. 4A to 4D show an exemplary integrated aftertreatment and exhaust heat exchanger that can be used as the integrated aftertreatment system assembly 302 in some embodiments. FIG. 4A shows a cross-section of the heat exchanger portion of the integrated aftertreatment system assembly 302 taken along a longitudinal axis 410, which includes the heat exchanger 314 and a valve assembly including a valve 322 and valve actuator 330. FIG. 4B is a cross-section of the integrated aftertreatment system assembly 302 taken at a plane orthogonal to the longitudinal axis 410 and through the heat exchanger. The heat exchanger portion 314 of the integrated aftertreatment system assembly 302 can include a casing 324 that encases the heat exchanger 314 and defines bypass flow passages 326. The upstream side of the exchanger portion of the integrated aftertreatment system assembly 302 includes deflection structure 328 that directs exhaust flow towards the heat exchanger 314.

FIGS. 4C and 4D show the operation of the exhaust gas valve 322. With reference to FIG. 4C, the control module 360 controls the actuator 330 to open the exhaust gas valve 322. The open valve causes the exhaust gas to flow through the exhaust heat exchanger 314, as shown by the arrows in the direction away from the aftertreatment portion of the integrated aftertreatment system assembly 302. In FIG. 4D, with the exhaust gas valve in the closed position, the exhaust gas is forced to flow around the heat exchanger 314 and through passages 326, thus bypassing the heat exchanger 314.

Figure 5:
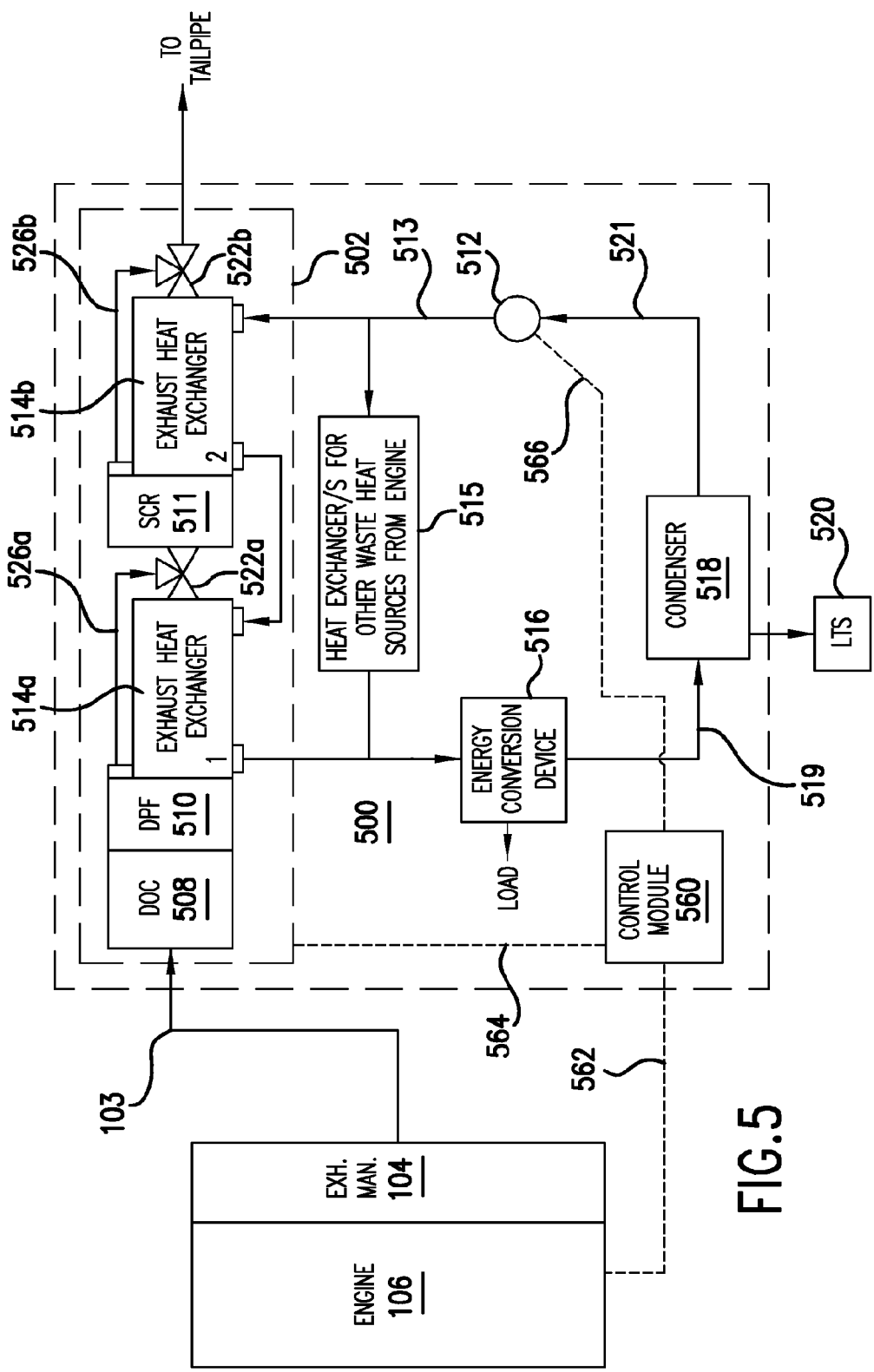
FIG. 5 is a diagram of a waste heat recovery system including an RC subsystem with two heat exchanger sections fluidly connected to, and sandwiching an SCR of an exhaust gas aftertreatment system for controllably capturing heat energy from the aftertreatment system according to an exemplary embodiment.

FIG. 5 is a diagram of a WHR system 500 according to an exemplary embodiment. As with FIGS. 1 to 3, items shown in FIG. 5 having numbers similar to reference numbers of items described above (i.e., items having reference numbers 100, 200 or 400 greater than those shown in FIGS. 1-4), are described above. The WHR system 500 includes an integrated aftertreatment/exhaust exchanger/valve system assembly 502 having a first exhaust heat exchanger 514a downstream of the DOC 508 and DPF 510, a first exhaust gas valve 522a downstream of the first heat exchanger 514a, an SCR 511 downstream of the first exhaust gas valve 522a and a second exhaust gas valve 522b downstream of the second exhaust heat exchanger 514b. The path of the working fluid of the WHR system 500 passes through the second heat exchanger 514b before it cycles through the first exhaust heat exchanger 514a. First exhaust gas valve 522a includes a controllable bypass flow path 526a between the DPF 510 and the first exhaust gas valve 522a, and second exhaust gas valve 522b includes a controllable bypass flow path between SCR 511 and the second exhaust gas valve 522b. Each of the first exhaust gas valve 522a and the second exhaust gas valve 522b includes an actuator (not shown) that is controllable via control module 560 to independently control an amount of exhaust gas flow through the respective exhaust gas heat exchangers 514a and 514b.

The WHR 500 integrates a heat exchanger 514a upstream of the SCR catalyst 511 to perform temperature regulation of the SCR system to optimize its performance and longevity. In some embodiments, temperature sensors are provided in the path of the exhaust at one or more positions along the aftertreatment system, for example, before, after and/or within one or more of the DOC 508, DPF 510 and SCR 511 aftertreatment devices. The control module 560 monitors exhaust gas temperature, and when exhaust gases are at a temperature higher than desired or permitted for the SCR catalyst, the heat exchanger 514a is used to remove exhaust heat. When exhaust gases are at or below a desired or predetermined temperature, the first heat exchanger 514a can be bypassed with the exhaust gas valve 522a to prevent heat transfer from exhaust gases to the first heat exchanger 514a. The second heat exchanger 514b is used downstream of the SCR catalyst 511 to capture waste heat input after the SCR catalyst 511 without impacting the SCR catalyst temperature. The exhaust gas valve 522b is provided on the downstream heat exchanger 514b to regulate the heat input to the ORC subsystem of the WHR system 500. The first and second exhaust heat exchangers 514a and 514b can have a structure similar to the integrated structure shown in FIGS. 4A to 4D, or utilize another bypass design.

Thus, embodiments consistent with the disclosure include a control module of the WHR system adapted to control elements of the RC system to control at least one RC parameter of the WHR system based on a detected aftertreatment event of a predetermined thermal management strategy of the aftertreatment system. These parameters can include, but are not limited to control of the temperature of various system elements, control of an amount of exhaust gas flow through heat exchangers and/or the flow RC working fluid via control of valves (e.g., exhaust gas valves 222, 322, 522a, 522b) and/or control of the flow rate of the working fluid (e.g., via variable speed pump 112, 212, 312 and 512, or via a flow restrictor) without adversely interfering with, or to assist with thermal management of the aftertreatment system. The control module (e.g., control module 160, 260, 360 and 560) can provide control data signals to elements of the WHR system (e.g., WHR system 100, 200, 300 and 500) corresponding to engine speed/load or some other thermal management strategy variable to directly control the RC subsystem parameters, such as in the case where the control module is an ECM/ECU. Alternatively, the control module can received data signals from an ECM/ECU and control RC parameters based on the received ECM/ECU data signals.

Other embodiments of an WHR system can include other sources of waste heat to increase the power recovery, including heat from oil of the internal combustion engine and/or use of a recuperator heat exchanger in the working fluid path from the energy conversion device (e.g., turbine) to the condenser of the RC subsystem to increase thermal efficiency of the cycle, and in the path from the fluid pump to the exhaust heat exchanger (e.g., boiler).

Although a limited number of exemplary embodiments are described herein, those skilled in the art will readily recognize that there could be variations, changes and modifications to any of these embodiments and those variations would be within the scope of the disclosure.

What is claimed is:

1. A waste heat recovery system including a Rankine cycle (RC) subsystem for converting heat energy of exhaust gas from an internal combustion engine, comprising:
   an exhaust gas heat exchanger fluidly coupled downstream of an exhaust aftertreatment system including a particulate filter, said exhaust gas heat exchanger adapted to transfer heat from the exhaust gas to a working fluid of the RC subsystem;
   an energy conversion device fluidly coupled to the exhaust gas heat exchanger and adapted to receive the working fluid having the transferred heat and convert the energy of the transferred heat;
   a condenser fluidly coupled to the energy conversion device and adapted to receive the working fluid from which the energy was converted; a pump having an inlet downstream of, and fluidly coupled to an outlet of the condenser and an outlet upstream of, and fluidly coupled to an inlet of the heat exchanger, said pump adapted to move fluid from the condenser to the heat exchanger; and
   a control module adapted to control at least one parameter of the RC subsystem based on a detected aftertreatment regeneration event of a predetermined thermal management strategy of the aftertreatment system, the detected aftertreatment regeneration event including at least one of a time expiration of counter configured to correspond with a periodic regeneration of the particulate filter, a predetermined change in a pressure measurement across the particulate filter, and a notification to perform a regeneration based on a soot load calculation.

2. The waste heat recovery system according to claim 1, wherein the aftertreatment system includes a selective catalyst reduction (SCR) element, and the control of the at least one parameter of the RC subsystem includes regulating an amount of exhaust gas flowing through the exhaust gas heat exchanger.

3. The waste heat recovery system according to claim 1, further comprising:
   a sensor adapted to sense a temperature of the working fluid and generate a signal characteristic of the sensed temperature of the working fluid; and
   a bypass valve adapted to provide a bypass exhaust gas flow path bypassing the heat exchanger and in parallel with an exhaust gas flow path through the heat exchanger, wherein the control module is adapted to control the bypass valve to bypass exhaust gas based on the generated signal.

4. The waste heat recovery according to claim 1, wherein the aftertreatment system comprises a particulate filter (PF) and an selective catalyst reduction (SCR) element, and the heat exchanger includes a first heat exchanger section positioned downstream of the PF and upstream of the SCR and second heat exchanger section positioned downstream of the SCR, each of said first and second heat exchanger sections including a bypass valve adapted to provide a bypass exhaust gas flow path that bypasses the heat exchanger section and is in parallel with an exhaust gas flow path through the heat exchanger section.

5. The waste heat recovery system according to claim 4, further comprising a sensor adapted to sense a temperature characteristic of the exhaust gas flow and generate a signal indicative of the sensed temperature characteristic of the exhaust gas flow, wherein, if the temperature is below a predetermined threshold value, the controller controls the bypass valves to provide more exhaust gas flow in the second heat exchanger section compared with the first heat exchanger section.

6. The waste heat recovery system according to claim 1, wherein the at least one controlled parameter of the RC subsystem includes control of a rate of flow of the working fluid.

7. An internal combustion engine system, comprising:
   an engine block including plural cylinders;
   an exhaust manifold fluidly connected to the block and adapted to provide a passage for exhaust gas resulting from combustion in the cylinders;
   an exhaust gas aftertreatment system fluidly connected to the exhaust manifold and including a diesel oxidation catalyst (DOC) and a particulate filter (PF);
   a waste heat recovery system including a Rankine cycle RC subsystem, said subsystem including a heat exchanger fluidly coupled downstream of the exhaust aftertreatment system, said exhaust heat exchanger adapted to transfer heat from the exhaust gas to a working fluid of the RC subsystem, and an energy conversion device fluidly coupled to the exhaust gas heat exchanger and adapted to receive the working fluid having said transferred heat and to convert the energy of the transferred heat; and
   a control module adapted to control at least one parameter of the RC subsystem based on a detected aftertreatment regeneration event of a predetermined thermal management strategy of the aftertreatment system, the detected aftertreatment regeneration event including at least one of a time expiration of counter configured to correspond with a periodic regeneration of the particulate filter, a predetermined change in a pressure measurement across the particulate filter, and a notification to perform a regeneration based on a soot load calculation.

8. The internal combustion engine according to claim 7, wherein the exhaust gas aftertreatment system and the heat exchanger comprise an integrated assembly.

9. The internal combustion engine according to claim 8, wherein the integrated assembly further comprises: at least one bypass channel adapted to provide a bypass exhaust gas flow path bypassing the heat exchanger and in parallel with an exhaust gas flow path through the heat exchanger, and a valve adapted to control an amount of exhaust gas flow through said at least one bypass channel based on said control of at least one parameter of the RC subsystem.

10. The internal combustion engine according to claim 9, wherein the exhaust gas aftertreatment system further includes a selective catalyst reduction (SCR) element.

11. The internal combustion engine according to claim 10, wherein the heat exchanger includes a first heat exchanger section positioned downstream of the DOC and the PF and upstream of the SCR and second heat exchanger section positioned downstream of the SCR, each of said first and second heat exchanger sections including a bypass valve adapted to provide a bypass exhaust gas flow path that bypasses the heat exchanger section and is in parallel with an exhaust gas flow path through the heat exchanger section.

12. The internal combustion engine according to claim 11, further comprising a sensor adapted to sense a temperature characteristic of the exhaust gas flow and generate a signal indicative of the sensed temperature characteristic of the exhaust gas flow, wherein, if the sensed temperature is below a predetermined threshold value, the controller controls the bypass valves to provide more exhaust gas flow in the second heat exchanger section compared with the first heat exchanger section.

13. The internal combustion engine according to claim 7, wherein the at least one controlled parameter of the RC subsystem includes control of a rate of flow of the working fluid.

14. A waste heat recovery system including a Rankine cycle (RC) subsystem for converting heat energy of exhaust gas from an internal combustion engine, comprising:
an exhaust gas heat exchanger fluidly coupled downstream of an exhaust aftertreatment system, said exhaust gas heat exchanger adapted to transfer heat from the exhaust gas to a working fluid of the RC subsystem;
an energy conversion device fluidly coupled to the exhaust gas heat exchanger and adapted to receive the working fluid having the transferred heat and convert the energy of the transferred heat;
a condenser fluidly coupled to the energy conversion device and adapted to receive the working fluid from which the energy was converted; a pump having an inlet downstream of, and fluidly coupled to an outlet of the condenser and an outlet upstream of, and fluidly coupled to an inlet of the heat exchanger, said pump adapted to move fluid from the condenser to the heat exchanger;
a control module adapted to control at least one parameter of the RC subsystem based on a detected aftertreatment event of a predetermined thermal management strategy of the aftertreatment system;
a sensor adapted to sense a temperature of the working fluid and generate a signal characteristic of the sensed temperature of the working fluid; and
a bypass valve adapted to provide a bypass exhaust gas flow path bypassing the heat exchanger and in parallel with an exhaust gas flow path through the heat exchanger, wherein the control module is adapted to control the bypass valve to bypass exhaust gas based on the generated signal.

15. A waste heat recovery system including a Rankine cycle (RC) subsystem for converting heat energy of exhaust gas from an internal combustion engine, comprising:
an exhaust gas heat exchanger fluidly coupled downstream of an exhaust aftertreatment system, said exhaust gas heat exchanger adapted to transfer heat from the exhaust gas to a working fluid of the RC subsystem;
an energy conversion device fluidly coupled to the exhaust gas heat exchanger and adapted to receive the working fluid having the transferred heat and convert the energy of the transferred heat;
a condenser fluidly coupled to the energy conversion device and adapted to receive the working fluid from which the energy was converted; a pump having an inlet downstream of, and fluidly coupled to an outlet of the condenser and an outlet upstream of, and fluidly coupled to an inlet of the heat exchanger, said pump adapted to move fluid from the condenser to the heat exchanger;
a control module adapted to control at least one parameter of the RC subsystem based on a detected aftertreatment event of a predetermined thermal management strategy of the aftertreatment system,
wherein the aftertreatment system comprises a particulate filter (PF) and an selective catalyst reduction (SCR) element, and the heat exchanger includes a first heat exchanger section positioned downstream of the PF and upstream of the SCR and second heat exchanger section positioned downstream of the SCR, each of said first and second heat exchanger sections including a bypass valve adapted to provide a bypass exhaust gas flow path that bypasses the heat exchanger section and is in parallel with an exhaust gas flow path through the heat exchanger section.

16. The waste heat recovery system according to claim 15, further comprising a sensor adapted to sense a temperature characteristic of the exhaust gas flow and generate a signal indicative of the sensed temperature characteristic of the exhaust gas flow, wherein, if the temperature is below a predetermined threshold value, the controller controls the bypass valves to provide more exhaust gas flow in the second heat exchanger section compared with the first heat exchanger section.

17. An internal combustion engine system, comprising:
an engine block including plural cylinders;
an exhaust manifold fluidly connected to the block and adapted to provide a passage for exhaust gas resulting from combustion in the cylinders;
an exhaust gas aftertreatment system fluidly connected to the exhaust manifold and including a diesel oxidation catalyst (DOC) and a particulate filter (PF);
a waste heat recovery system including a Rankine cycle RC subsystem, said subsystem including a heat exchanger fluidly coupled downstream of the exhaust aftertreatment system, said exhaust heat exchanger adapted to transfer heat from the exhaust gas to a working fluid of the RC subsystem, and an energy conversion device fluidly coupled to the exhaust gas heat exchanger and adapted to receive the working fluid having said transferred heat and to convert the energy of the transferred heat; and
a control module adapted to control at least one parameter of the RC subsystem based on a detected aftertreatment event of a predetermined thermal management strategy of the aftertreatment system,
wherein the exhaust gas aftertreatment system and the heat exchanger comprise an integrated assembly and wherein the integrated assembly further comprises: at least one bypass channel adapted to provide a bypass exhaust gas flow path bypassing the heat exchanger and in parallel with an exhaust gas flow path through the heat exchanger, and a valve adapted to control an amount of exhaust gas flow through said at least one bypass channel based on said control of at least one parameter of the RC subsystem.

18. The internal combustion engine according to claim 17, wherein the exhaust gas aftertreatment system further includes a selective catalyst reduction (SCR) element.

19. The internal combustion engine according to claim 18, wherein the heat exchanger includes a first heat exchanger section positioned downstream of the DOC and the PF and upstream of the SCR and second heat exchanger section positioned downstream of the SCR, each of said first and second heat exchanger sections including a bypass valve adapted to provide a bypass exhaust gas flow path that bypasses the heat exchanger section and is in parallel with an exhaust gas flow path through the heat exchanger section.

20. The internal combustion engine according to claim 19, further comprising a sensor adapted to sense a temperature characteristic of the exhaust gas flow and generate a signal indicative of the sensed temperature characteristic of the exhaust gas flow, wherein, if the sensed temperature is below a predetermined threshold value, the controller controls the bypass valves to provide more exhaust gas flow in the second heat exchanger section compared with the first heat exchanger section.

\* \* \* \* \*